(12) United States Patent
Wallace, Jr.

(10) Patent No.: US 6,349,269 B1
(45) Date of Patent: Feb. 19, 2002

(54) THERMAL MANAGEMENT DATA PREDICTION SYSTEM

(75) Inventor: Douglas E. Wallace, Jr., Austin, TX (US)

(73) Assignee: Dell U.S.A., L.P., Round Rock, TX (US)

(*) Notice: Subject to any disclaimer, the term of this patent is extended or adjusted under 35 U.S.C. 154(b) by 0 days.

(21) Appl. No.: 09/209,795

(22) Filed: Dec. 11, 1998

(51) Int. Cl.[7] ............................................... G01K 1/12
(52) U.S. Cl. ........................ 702/132; 702/176; 702/130; 361/93.2; 361/93.6; 361/93.8; 713/324
(58) Field of Search ........................... 702/132; 713/300, 713/324; 307/107

(56) References Cited

U.S. PATENT DOCUMENTS

| | | | |
|---|---|---|---|
| 4,878,184 A | * 10/1989 | Okada et al. ................ 364/557 |
| 4,884,222 A | * 11/1989 | Nagashima ................. 364/550 |
| 5,094,702 A | * 3/1992 | Kothmann et al. .......... 148/128 |
| 5,281,026 A | 1/1994 | Bartilson et al. ............ 374/143 |
| 5,392,031 A | * 2/1995 | Toriumi et al. .............. 340/588 |
| 5,416,469 A | 5/1995 | Colling ........................ 340/573 |
| 5,448,143 A | 9/1995 | Pecone ........................ 318/434 |
| 5,568,350 A | 10/1996 | Brown ......................... 361/104 |
| 5,574,667 A | 11/1996 | Dinh et al. .................. 364/557 |
| 5,632,555 A | * 5/1997 | Gregory et al. .............. 374/102 |
| 5,738,441 A | * 4/1998 | Cambridge et al. ......... 374/102 |

* cited by examiner

Primary Examiner—Marc S. Hoff
Assistant Examiner—Paul Kim
(74) Attorney, Agent, or Firm—Skjerven Morrill MacPherson, LLP; Stephen A. Terrile (57) ABSTRACT

A thermal management of a computer system may be advantageously obtained by predicting temperature variations based upon past temperature readings. Such a system may, in preferred embodiments, filter the past temperature data to provide a more precise value, allow for a floating trip level that will change with the rate of temperature change and even allow for prediction of the amount of time left before a system shutdown may occur.

24 Claims, 6 Drawing Sheets

THERMAL MANAGEMENT DATA PREDICTION SYSTEM

RESERVATION OF COPYRIGHT

A portion of the disclosure of this patent document contains material to which a claim of copyright protection is made. The copyright owner has no objection to the facsimile reproduction by anyone of the patent document or the patent disclosure, as it appears in the Patent and Trademark Office patent file or records, but reserves all other rights whatsoever.

BACKGROUND

1. Field

The field relates to computer systems and more particularly to managing the thermal operation of computer systems.

2. Description of the Related Art

Personal computer systems in general and IBM compatible personal computer systems in particular have attained widespread use. These personal computer systems now provide computing power to many segments of today's modern society. A personal computer system can usually be defined as a desktop, floor-standing, or portable microcomputer that includes a system unit having a system processor with associated volatile and non-volatile memory, a display monitor, a keyboard, a hard disk storage device or other type of storage media such as a floppy disk drive or a compact disk read only memory (CD ROM) drive. One of the distinguishing characteristics of these systems is the use of a system board or motherboard to electrically connect these components together. These personal computer systems are information handling systems which are designed primarily to give independent computing power to a single user or group of users and are inexpensively priced for purchase by individuals or small businesses.

Portable computers are often referred to as laptop, notebook or subnotebook computers. These computers typically incorporate a flat panel display such as a liquid crystal display (LCD) or other relatively small display. One challenge associated with computer systems in general and portable computer systems specifically is controlling the heat that is generated by the system. Because computer systems have a number of heat generating components, such as the processor, it is important to determine when the heat of the system is past a certain predetermined threshold. More specifically, component temperature data that is acquired for thermal management is provided as a digital integer in one degree Celsius increments. The current accuracy of the component temperature data is plus or minus three degrees. In known systems, a go/no-go trip point is provided. This trip point is often conservatively estimated below the point of permanent damage to the computer system because of the inaccuracy of the device providing the component temperature data. More importantly, from the user's viewpoint, no warning is given before the computer is shut down, potentially causing loss of data.

SUMMARY

It has been discovered that a thermal management of a computer system may be advantageously obtained by predicting temperature variations based upon past temperature readings. Such a system may, in preferred embodiments, filter the past temperature data to provide a more precise value, allow for a floating trip level that changes with the rate of temperature change and even allow for prediction of the amount of time left before a system shutdown may occur.

More specifically, in one aspect, a method for managing thermal operation of a device is set forth. The method includes obtaining a first temperature value for the device; obtaining a second temperature value for the device, the obtaining the second temperature value being separated from the obtaining the first temperature value by an amount of time; calculating a difference between the first and second temperature values; and, calculating a rate of temperature change based upon the difference between the first temperature and second temperature values divided by the amount of time.

In another aspect, a thermal management system which includes a temperature sensor and a slope calculation module is set forth. The temperature sensor senses a first temperature value and a second temperature value. The first temperature value and the second temperature value are separated by an amount of time. The slope calculation module calculates a rate of temperature change based upon a temperature difference between the first temperature value and the second temperature value divided by the amount of time.

In another aspect, a computer system which includes a processor, a memory coupled to the processor, a temperature sensor coupled to the processor, and a thermal management system is set forth. The temperature sensor senses a first temperature value and a second temperature value. The first temperature value and the second temperature value are separated by an amount of time. The thermal management system is stored on the memory. The thermal management system includes a slope calculation module which calculates a rate of temperature change based upon a temperature difference between the first temperature value and the second temperature value divided by the amount of time.

BRIEF DESCRIPTION OF THE DRAWINGS

The use of the same reference symbols in different drawings indicates similar or identical items.

DETAILED DESCRIPTION

Figure 1:
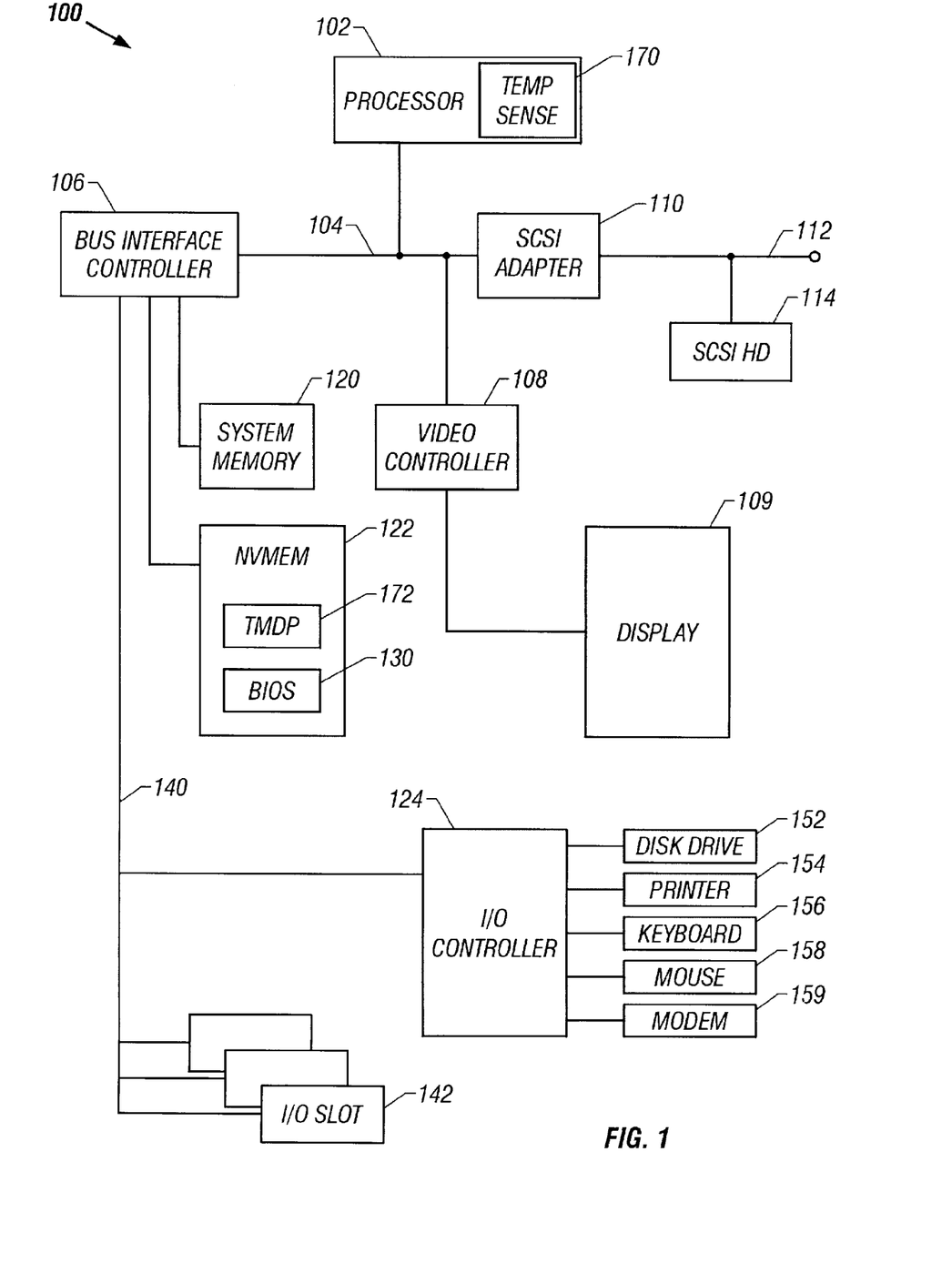
FIG. 1 is a block diagram showing a computer system having a thermal management data prediction system.

FIG. 1 is a block diagram of a computer 100 which employs a thermal management data prediction system. Computer system 100 includes system processor 102, coupled to local bus 104 which, in turn, is coupled to bus interface controller 106, video controller 108 and small computer system interface (SCSI) adapter 110. Processor 102 is preferably a microprocessor from the family of x86 processors. Local bus 104 includes conventional data, address and control lines conforming to, for example, the peripheral connect interface (PCI) architecture. SCSI adapter 110 couples local bus 104 to SCSI bus 112 to which SCSI devices such as a SCSI hard drive 114 may be coupled. Computer system 100 also includes system memory 120, non-volatile memory 122 and I/O controller 124, which are all coupled to bus interface controller 106.

Bus interface controller 106 performs two primary functions. The first function that bus interface controller 106 performs is as a memory controller for accessing system memory 120 and non-volatile memory 122. System memory 120 is a dynamic random access memory (RAM) which includes one or more single, in-line memory modules (SIMMS) and stores programs and data for execution by system processor 102. Nonvolatile memory 122 includes, e.g., a read only memory (ROM) which stores microcode including the basic input output system (BIOS) 130 of computer system 100. Non-volatile memory 122 may include other types of non-volatile memory such as floppy disks, hard disk drivers, compact disc ROM (CDROM).

BIOS 130 is a microcode software interface between an operating system or application programs and the hardware of system 100. The operating system and application programs access BIOS 130 rather than directly manipulating I/O ports and control words of the specific hardware. BIOS 130 is accessed through an interface of software interrupts and contains a plurality of entry points corresponding to the different interrupts. In operation, BIOS 130 is loaded from non-volatile memory 122 to system memory 120 and is executed from system memory 120.

The second function that bus interface controller 106 performs is as an interface between bus 104 and input/output (I/O) bus 140. I/O bus 140 conforms to the industry standard architecture (ISA) standard, which is also sometimes referred to as the AT bus standard. Bus 140 is further coupled to I/O controller 124, and a plurality of I/O slots 142, into which a variety of I/O or expansion cards (not shown) may be inserted.

I/O controller 124 is also coupled to and controls the operation of disk drive 152, printer 154, keyboard 156 and mouse 158. I/O controller 124 also includes a modem port to which a modem 159 may be optionally connected.

Processor 102 includes temperature sensor 170. Temperature sensor 170 determines a temperature value and writes this temperature value to a memory location. Temperature sensor 170 may be located anywhere within computer system 100. Non-volatile memory 122 also includes thermal management data prediction system 172. In operation, thermal management data prediction system 172 is executed by processor 102. More specifically, thermal management data prediction system 172 uses the temperature value as well as a time value to predict the temperature characteristics of computer system 100.

Figure 2:
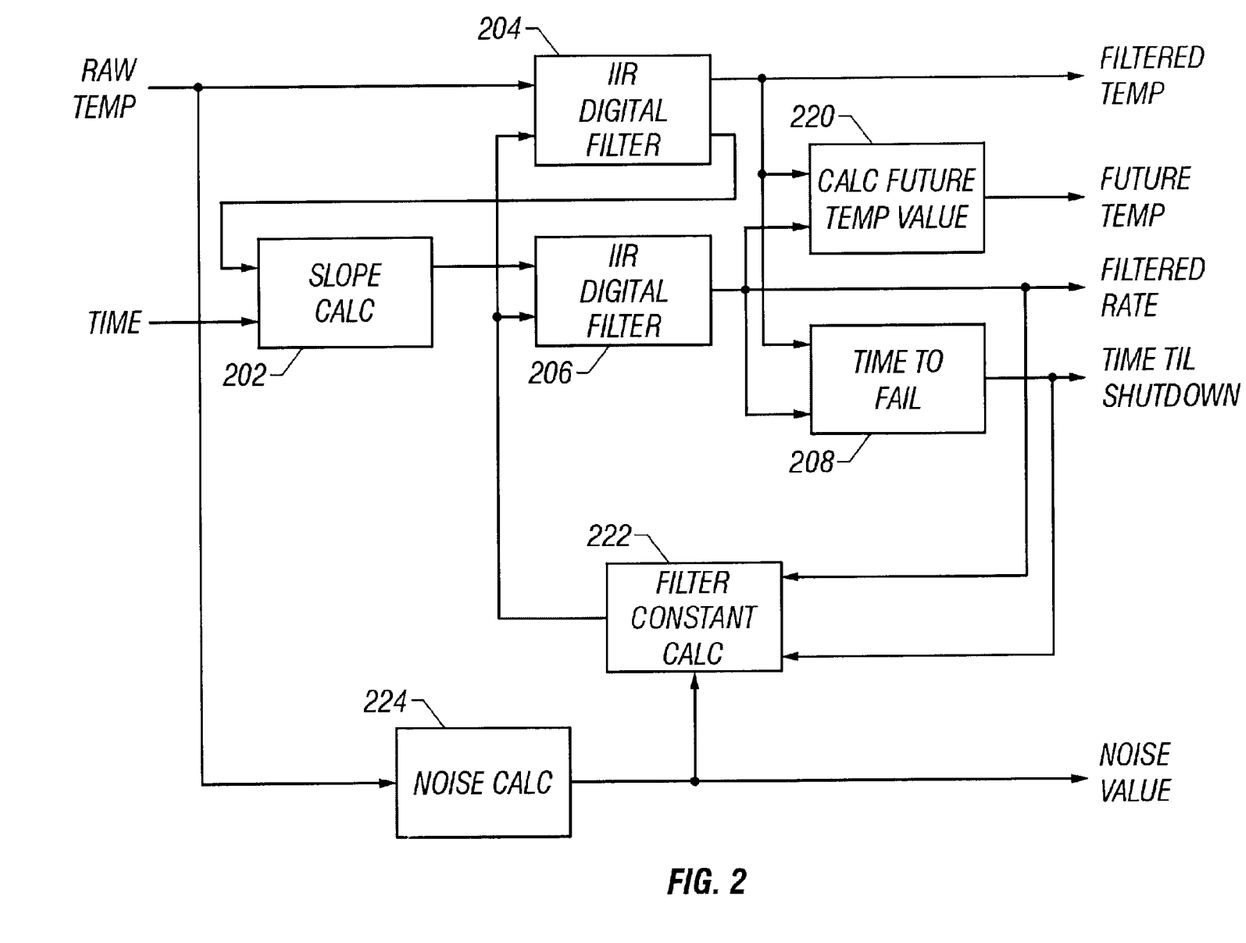
FIG. 2 is a block diagram showing one implementation of a thermal management data prediction system.

Referring to FIG. 2, thermal management data prediction system 172 includes slope calculation module 202, filter modules 204, 206, which may be, e.g., infinite impulse response filters, and time calculation module 208. In a preferred embodiment, thermal management data prediction system 172 may also include future temperature calculation module 220, filter constant calculation module 222 and noise calculation module 224.

Thermal management data prediction system 172 receives a temperature value from processor 102 as well as a time value and provides a filtered temperature value, a filtered rate value and a time until shutdown value. More specifically, the time value may be a standard time tick value such as a number of milliseconds since startup of the computer system which is stored as a long integer variable. Alternatively, the time value may be inherently provided as a constant value by design if the thermal management prediction system operates at a fixed known sampling rate. Filter 204 receives the temperature value and provides a filtered temperature value. Slope calculation module 202 receives the time value and filtered temperature value and calculates differences in time and temperature since the last time value and filtered temperature value were received. Slope calculation module 202 provides the time and temperature difference information to filter 206. Filter 206 provides a filtered rate value. Time calculation module 208 receives the filtered temperature value and the filtered rate value and calculates a time to shutdown value. Future temperature calculation module 220 receives the filtered temperature value, and the filtered rate value and provides a future temperature value. Filter constant calculation module 222 receives the filtered rate value and the time until shutdown value, and the temperature noise value, and provides a filter constant. The noise calculation module 224 receives the raw temperature value and provides a temperature noise value.

Figure 3A:
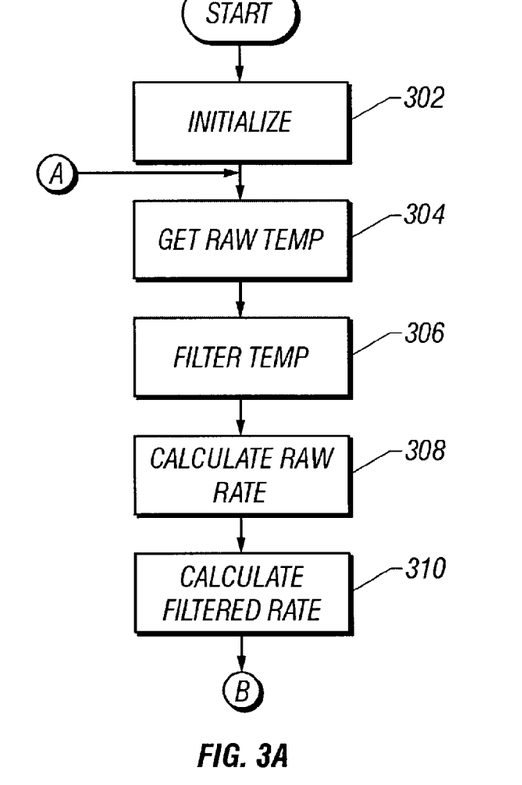
FIGS. 3A and 3B, generally referred to as FIG. 3, are a flow chart showing the operation of the thermal management data prediction system of FIG. 2.
Figure 3B:
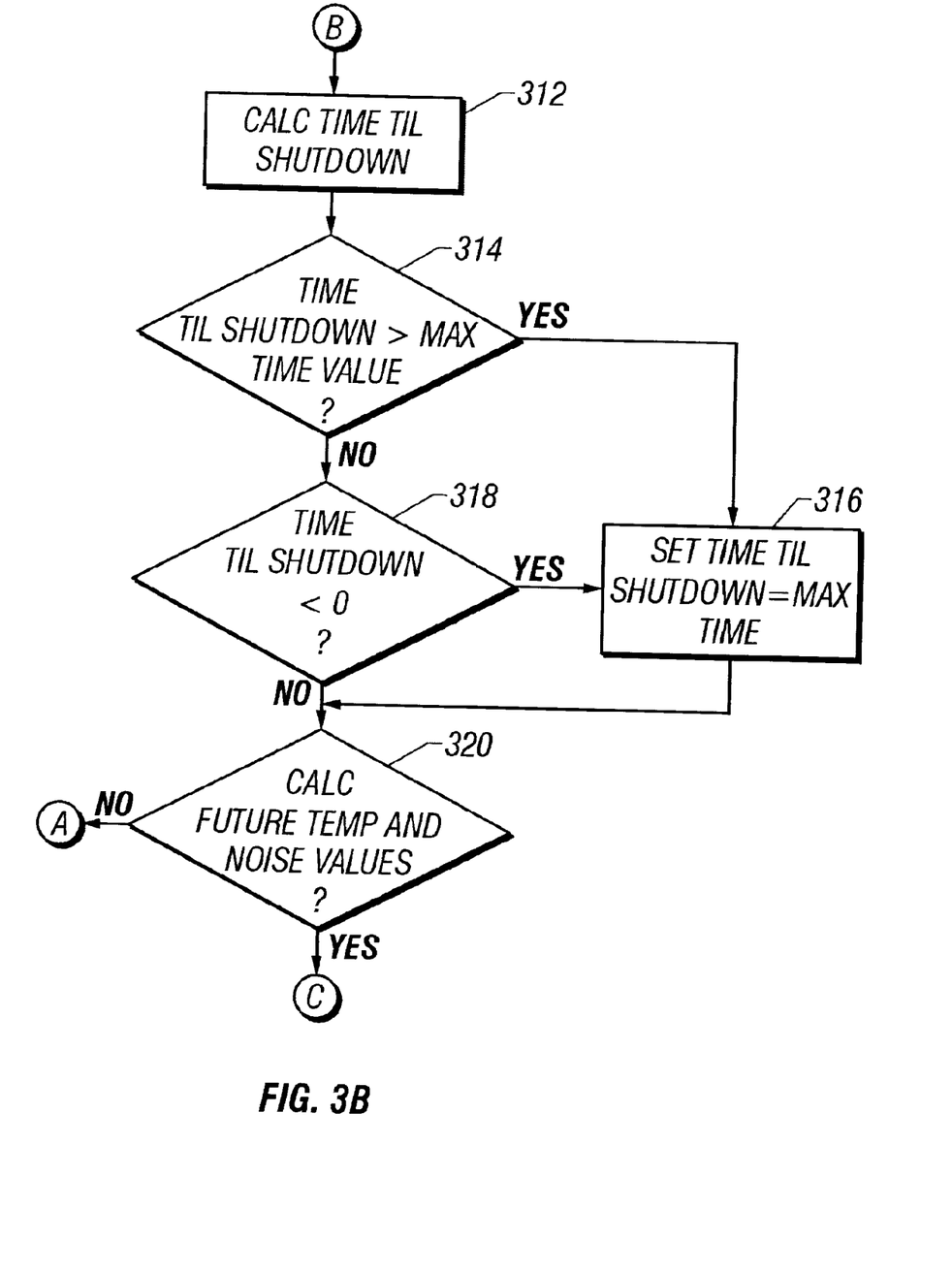

Referring to FIG. 3, when the thermal management prediction system 172 executes, the system 172 first initializes variables at initialize variable step 302. One implementation for initializing the variables is set forth by the following code written in C programming language.

```
get(rawtemp(i));
filtered_temp(i)=rawtemp(i);
filtered_rate(i)=0;
``` where, rawtemp(i)=the present raw temperature input value provided by processor 102, filtered_temp(i)=the present filtered temperature value, and filtered_rate(i)=the present filtered temperature rate value.

After the variables are initialized, then system 172 obtains a new raw temperature value from processor 102 at get raw temperature step 304 by reading the memory location to which the raw temperature value is written. One implementation for obtaining the raw temperature value is set forth by the following code written in C programming language.

```
get(rawtemp(i));
```

After the raw temperature is obtained, then system 172 calculates a filter temperature value at calculate filter temperature value step 306. The new filtered temperature equals the old filtered temperature multiplied by a filter constant, the result of which is added to the result of the raw temperature multiplied by one minus the filter constant. One implementation for calculating the filtered temperature value is set forth by the following code written in C programming language.

```
filtered_temp(i+1)=filtered_temp(i)*fconst+(1−fconst)
   *rawtemp(i);
``` where, filtered_temp(i)=present filtered temperature value, filtered_temp(i+1)=new filtered temperature value, and fconst=a filter constant for the temperature filter.

The filter constant, fconst, is a value between 0.0 and 1.0, where 0.0 represents no filtering, and 1.0 represents maximum filtering. In a first order IIR (Infinite Impulse Response) filter shown, the filter's response is approximately equivalent to a filter that averages the previous N samples, where N is approximately N=1.0/(1.0−fconst)

and conversely fconst=1.0−1.0/N

For example, to achieve a filtered temperature value resolution of 0.2 degrees from raw temperature values of resolution 1 degree, 5 samples are averaged. Thus N would equal 5, thereby providing a filter constant value of 0.8.

The actual filter constants used in the thermal management prediction system 172 are determined based on the typical sensor noise of temperature sensor 170. Accordingly, this filter constant is empirically determined for a particular system. It is believed that a desirable filter constant range is between 0.8 to 0.96.

Increasing the filter constant provides better resolution and noise reduction, while lowering the response time of the system 172. Accordingly, the advantages of increasing the value of the filter constant, (better resolution, noise reduction), are weighed against the main disadvantages of a lower response time. Therefore, it may be desirable to dynamically vary the filter constant during use to adapt to noise levels and allow the filter to adjust itself.

After the filter constant is calculated, then system 172 calculates a raw rate value at calculate raw rate step 308. One implementation for calculating the raw rate value is set forth by the following code written in C programming language.

rawrate(i)=(filtered_temp(i+1)−filtered_temp(i))/(T(i+1)−T(i));

where,

T(i)=a time value of sample X(i), and

T(i+1)=a time value of sample X(i+1).

If the temperature is sampled periodically at fixed time intervals, then (T(i+1)−T(i)) is a time constant and need not be calculated each time that the raw rate value is calculated. In this instance, the time constant would be calculated during the initialization step 302. After the raw rate value is calculated, then system 172 calculates a filtered rate value at calculate filtered rate step 310. One implementation for calculating the filtered rate value is set forth by the following code written in C programming language.

filtered_rate(i)=filtered_rate(i)*fconst_rate+(1−fconst_rate)*rawrate(i);

where, filtered_rate(i+1) a new filtered temperature rate, and fconst_rate=a filter constant for temperature rate filter.

Note that if the raw rate is a constant, then there is no need to calculate a filtered rate and the raw rate may be used by system 172. After the filtered rate value is calculated, then system 172 calculates a time until shutdown value at calculate time until shutdown step 312. One implementation for calculating the time until shutdown value is set forth by the following code written in C programming language.

time_til_shutdown=(temp_limit−filtered_temp(i+1))/filtered_rate(i+1)+0.00001);

where, time_til_shutdown=a time value indicating the remaining time until computer system 100 would shutdown due to high temperature, and temp_limit=a temperature value at which computer system 100 shuts down from high temperature.

After the time until shutdown value is calculated, then system 172 determines whether the time until shutdown value is greater than a maximum time value (indicating there is no immanent danger of shutdown due to high temperature) at determination step 314. If the time until shutdown value is greater than the maximum time value, then the time until shutdown is set to the maximum time value at set time step 316. One implementation for determining whether the time until shutdown value is greater than the maximum time value and for setting the maximum time value is set forth by the following code written in C programming language.

if(time_til_shutdown>MAX_TIME_VALUE)
    time_til_shutdown=MAX_TIME_VALUE;

After the maximum time value is set, then system returns to step 304 to obtain another temperature value. If system 172 determines that the time until shutdown is less than the maximum time value, then system 172 determines whether the time until shutdown is less then zero (indicating that the temperature is dropping) at determination step 318. If the time until shutdown value is less than zero, then the time until shutdown is set to the maximum time value at set time step 316. One implementation for determining whether the time until shutdown is less than zero and for setting the maximum time value is set forth by the following code written in C programming language.

if(time_til-shutdown<0)
    time_til_shutdown=MAX_TIME_VALUE;

After the maximum time value is set, then system returns to step 304 to obtain another temperature value.

Figure 4:
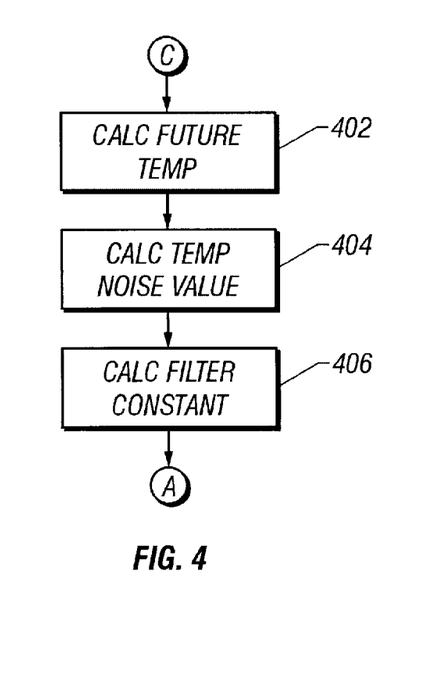
FIG. 4 is a flow chart showing the operation of additional aspects of the thermal management data prediction system of FIG. 2.

Referring to FIG. 4, in addition to calculating the filtered temperature, the filtered rate and the time until shut down, system 172 may also calculate a future temperature value and a temperature noise value. More specifically, rather than returning to step 304 to obtain another raw temperature value, system would calculate a future temperature value at calculate future temperature value step 402. One implementation for calculating the future temperature value is set forth by the following code written in C programming language.

future_temp=filtered_rate(i+1)*time_value+filtered_temp(i+1);

where, time_value=the difference in the future time from the present time.

After the future temperature value is calculated, then system 172 may also calculate a temperature noise value at calculate temperature noise value step 404. One implementation for calculating the temperature noise value is set forth by the following code written in C programming language.

temp_noise_value(i+1)=temp_noise_value(i)
      *nfconst+fabs((rawtemp(i)-2*rawtemp(i-1)+rawtemp
      (i-2)*(1-nfconst);

where, temp_noise_value=a value used to increase or decrease the filter constant for the temperature filter, nfconst=a filter constant for the noise filter fabs=an absolute value function More specifically, the temperature noise value can be used to modify the filtered temperature filter constant to increase the filtering in the presence of increased noise, e.g., fluctuations in the raw temperature signal. One Block 406 implementation for calculating a new filter constant is set forth by the following code written in the C programming language.

nfconst=1-1/(5.0+20.0* temp_noise_value(i+1)

The values 5.0 and 20.0 are empirically determined, and both may be modified to provide a limit to the lowest value for the filter constant, (when the temperature noise value is zero), and the rate of response by the system 172 to a change in the noise value. Other implementations of calculating a filter constant may include using the filtered rate and time_til_shut down values which might be designed to decrease the filter constant when temperature rates are high (e.g., the temperature is approaching the temperature limit at an undesirable fast rate), or time until shutdown is low (e.g., there is very little time left until shutdown such as less than a minute). Decreasing the filter rate speeds up the filter response during important times, such as fast temperature rises or low time until shutdown.

Figure 5:
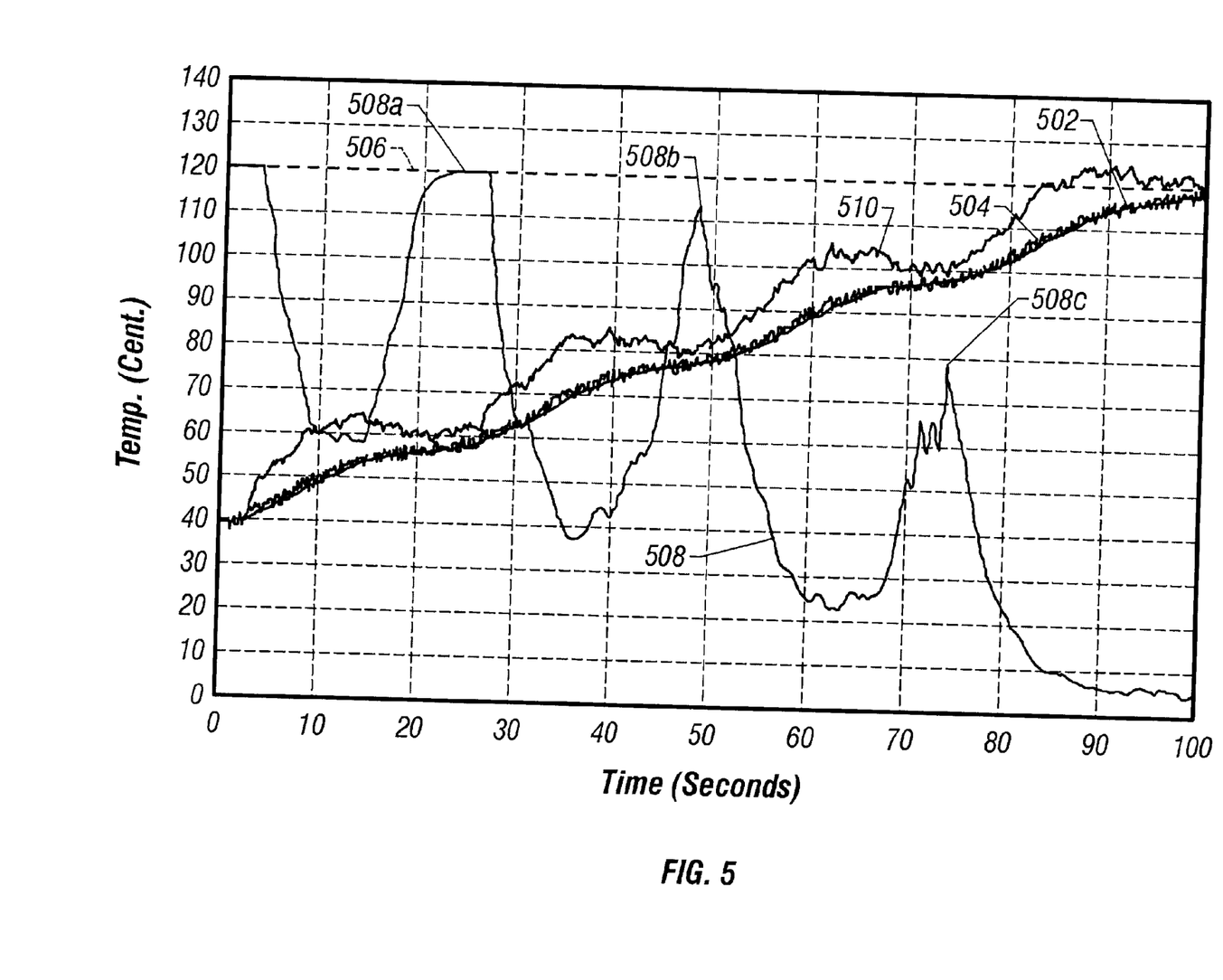
FIG. 5 is a graph showing an exemplative operation of the thermal management data prediction system of FIG. 2.

Referring to FIG. 5, a graph of an exemplative operation of the thermal management data prediction system 172 is shown. More specifically, in the graph the maximum time value is set t0 100 seconds and the maximum temperature is set to 120 degrees Celsius. The raw temperature value of the computer system 100 is represented by line 502. The filtered temperature value is represented by line 504. The temperature limit value is represented by line 506. The time until shutdown is represented by line 508. The future temperature value, where the future is 10 seconds ahead of the present time value, is represented by line 510.

Note that the filtered temperature value as represented by line 504 provides a smoother waveform of the raw temperature samples as represented by line 502. Also, note that the more level the temperature value, the higher the value of the time until shutdown, see, e.g., peaks 508a, 508b, 508c. Also, note that the more level the temperature value, the more that the future temperature value as represented by line 510 corresponds to the raw temperature value as represented by line 502.

Figure 6:
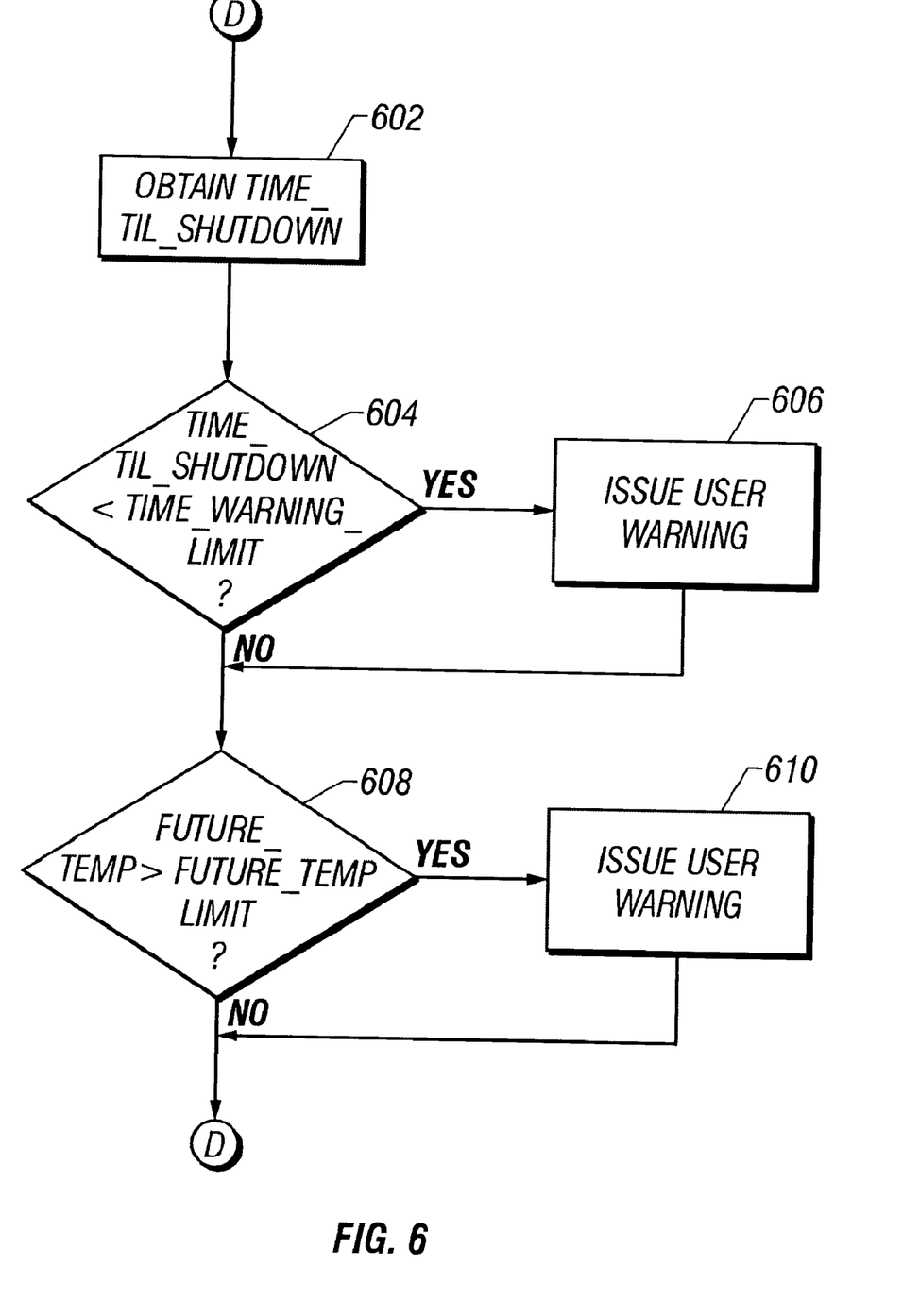
FIG. 6 is a flow chart showing the operation of additional aspects of the thermal management data prediction system of FIG. 2.

Referring to FIG. 6, once the time until shutdown value is determined, then thermal management data prediction system 172 use this value to issue a user warning. More specifically, the time until shutdown value is obtained during obtain step 602. This time until shutdown value is then compared to a time warning limit value to determine whether the time until shutdown is less than the time warning limit value at determination step 604. If the time until shutdown is less then the time warning limit value, then a warning is issued to a user at warning step 606. The warning may be issued for example, by providing a message to the user via display 109. Thermal management data prediction system 172 may then optionally compare the future temperature value to a future temperature limit value at determination step 608. If the future temperature value is greater than the future temperature limit value, then a warning is issued to a user at warning step 610. Again, the warning may be issued by providing a message to the user via display 109.

OTHER EMBODIMENTS

Other embodiments are within the following claims.

For example, while in the preferred embodiment, the example instructions are shown in C language, the thermal management data prediction system may be implemented using of any suitable programming language or structure.

Also for example, while the preferred embodiment is shown implemented using software, the thermal management data prediction system may be implemented using circuits, such as application specific integrated circuits (ASICs) to achieve the advantages of the thermal management data prediction system.

Also for example, while a specific implementation of a computer system is disclosed, it will be appreciated that the thermal management data prediction system is applicable to any computer system implementation and in fact to any device in which managing thermal operation is desirable.

What is claimed is:

1. A method for managing thermal operation of a device comprising obtaining a first temperature value for the device;

obtaining a second temperature value for the device, the obtaining the second temperature value being separated from the obtaining the first temperature value by an amount of time;

calculating a difference between the first and second temperature values; and, calculating a rate of temperature change based upon the difference between the first temperature and second temperature values divided by the amount of time, calculating a time until shutdown value based upon the rate of temperature change, the time until shutdown indicating time remaining until the device exceeds a temperature limit value; and determining whether the time until shutdown value is greater than a maximum time value.

2. The method of managing thermal operation of a device of claim 1 wherein:

the amount of time is a periodically recurring amount of time.

3. The method of managing thermal operation of a device of claim 1 wherein:

the first temperature value and the second temperature value are raw temperature values; and further comprising, filtering the first temperature value to provide a first filtered temperature value;

filtering the second temperature value to provide a second filtered temperature value; and, using the first filtered temperature value and the second filtered temperature value to calculate the difference.

4. The method of claim 3 further comprising:

calculating a filter temperature constant; and wherein, the filtering the first temperature value and the filtering the second temperature value use the filter temperature constant to increase a filtering response in the presence of increased fluctuations in the first and second temperature values.

5. The method of claim 4 further comprising:

decreasing the filter temperature constant when the rate of temperature change value is high to increase filter response during the filtering of the first and second temperature values.

6. The method of claim 4 further comprising:

calculating a time until shutdown value based upon the rate of temperature change, the time until shutdown indicating time remaining until the device exceeds a temperature limit value; and, decreasing the filter temperature constant when the time until shutdown value is low to increase filter response during the filtering of the first and second temperature values.

7. A method for managing thermal operation of a device comprising:

obtaining a first temperature value for the device;

obtaining a second temperature value for the device, the obtaining the second temperature value being separated from the obtaining the first temperature value by an amount of time;

calculating a difference between the first and second temperature values; and, calculating a rate of temperature change based upon the difference between the first temperature and second temperature values divided by the amount of time;

calculating a time until shutdown value based upon the rate of temperature change, the time until shutdown indicating time remaining until the device exceeds a temperature limit value; and, determining whether the time until shutdown is less than zero.

8. The method of claim 1 further comprising:

calculating a future temperature value based upon the rate of temperature change.

9. A thermal management system comprising:

a temperature sensor, the temperature sensor sensing a first temperature value and a second temperature value, the first temperature value and the second temperature value being separated by an amount of time;

a slope calculation module, the slope calculation module calculating a rate of temperature change based upon a temperature difference between the first temperature value and the second temperature value divided by the amount of time a time until shutdown module, the time until shutdown module calculating a time until shutdown value based upon the rate of temperature change, the time until shutdown indicating time remaining until the device exceeds a temperature limit value, the time until shutdown module determining whether the time until shutdown value is greater than a maximum time value.

10. The thermal management system of claim 9 wherein: the amount of time is a periodically recurring amount of time.

11. The thermal management system of claim 9 wherein:

the first temperature value and the second temperature value are raw temperature values; and further comprising, a filter module, the filter module filtering the first temperature value to provide a first filtered temperature value and filtering the second temperature value to provide a second filtered temperature value, the first filtered temperature value and the second filtered temperature value being provided to the slope calculation module to calculate the temperature difference.

12. The thermal management system of claim 11 wherein:

the filter module uses a filter temperature constant to increase a filtering response in the presence of increased fluctuations in the first and second temperature values.

13. The thermal management system of claim 12 wherein:

the filter module uses a lower filter temperature constant when the rate of temperature change value is high to increase filter response during the filtering of the first and second temperature values.

14. The thermal management system of claim 12 further comprising:

a time until shutdown module, the time until shutdown module calculating a time until shutdown value based upon the rate of temperature change, the time until shutdown indicating time remaining until the device exceeds a temperature limit value; and, wherein the filter temperature constant is decreased when the time until shutdown value is low to increase filter response during the filtering of the first and second temperature values.

15. A thermal management system comprising:

a temperature sensor, the temperature sensor sensing a first temperature value and a second temperature value, the first temperature value and the second temperature value being separated by an amount of time;

a slope calculation module, the slope calculation module calculating a rate of temperature change based upon a temperature difference between the first temperature value and the second temperature value divided by the amount of time; and a time until shutdown module, the time until shutdown module calculating a time until shutdown value based upon the rate of temperature change, the time until shutdown indicating time remaining until the device exceeds a temperature limit value, the time until shutdown module determining whether the time until shutdown is less than zero.

16. The thermal management system of claim 9 wherein:

the time until shutdown module calculates a future temperature value based upon the rate of temperature change.

17. A computer system comprising:

a processor;

a memory coupled to the processor;

a temperature sensor coupled to the processor, the temperature sensor sensing a first temperature value and a second temperature value, the first temperature value and the second temperature value being separated by an amount of time; and a thermal management system stored on the memory, the thermal management system including a slope calculation module, the slope calculation module calculating a rate of temperature change based upon a temperature difference between the first temperature value and the second temperature value divided by the amount of time; and, a time until shutdown module, the time until shutdown module calculating a time until shutdown value based upon the rate of temperature change, the time until shutdown indicating time remaining until the device exceeds a temperature limit value, the time until shutdown module determining whether the time until shutdown value is greater than a maximum time value.

18. The computer system of claim 17 wherein:

the amount of time is a periodically recurring amount of time.

19. The computer system of claim 17 wherein:

the first temperature value and the second temperature value are raw temperature values; and the thermal management system further includes a filter module, the filter module filtering the first temperature value to provide a first filtered temperature value and filtering the second temperature value to provide a second filtered temperature value, the first filtered temperature value and the second filtered temperature value being provided to the slope calculation module to calculate the temperature difference.

20. The computer system of claim 19 wherein:

the filter module uses a filter temperature constant to increase a filtering response in the presence of increased fluctuations in the first and second temperature values.

21. The computer system of claim 20 wherein:

the filter module uses a lower filter temperature constant when the rate of temperature change value is high to increase filter response during the filtering of the first and second temperature values.

22. The computer system of claim 20 wherein the thermal management system further includes:

a time until shutdown module, the time until shutdown module calculating a time until shutdown value based upon the rate of temperature change, the time until shutdown indicating time remaining until the device exceeds a temperature limit value; and, wherein the filter temperature constant is decreased when the time until shutdown value is low to increase filter response during the filtering of the first and second temperature values.

23. A computer system comprising:

a processor;

a memory coupled to the processor;

a temperature sensor coupled to the processor, the temperature sensor sensing a first temperature value and a second temperature value, the first temperature value and the second temperature value being separated by an amount of time; and a thermal management system stored on the memory, the thermal management system including a slope calculation module, the slope calculation module calculating a rate of temperature change based upon a temperature difference between the first temperature value and the second temperature value divided by the amount of time, and a time until shutdown module, the time until shutdown module calculating a time until shutdown value based upon the rate of temperature change, the time until shutdown indicating time remaining until the device exceeds a temperature limit value, the time until shutdown module determining whether the time until shutdown is less than zero.

24. The computer system of claim 17 wherein:

the time until shutdown module calculates a future temperature value based upon the rate of temperature change.

* * * * *